United States Patent
Jawaharlal et al.

(10) Patent No.: US 9,591,464 B2
(45) Date of Patent: Mar. 7, 2017

(54) ENHANCED MOBILE CALLING WITH CALL PURPOSE

(71) Applicant: International Business Machines Corporation, Armonk, NY (US)

(72) Inventors: Samuel Mathew Jawaharlal, Chennai (IN); Bala Priyadarshini Muralidharan, Bangalore (IN); Arunachalam Narayanan, Chennai (IN); Sathya Santhar, Chennai (IN); Balamurugaramanathan Sivaramalingam, Ramanathapuram (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/706,073

(22) Filed: May 7, 2015

(65) Prior Publication Data
US 2016/0330596 A1    Nov. 10, 2016

(51) Int. Cl.
*H04M 3/00* (2006.01)
*H04W 4/12* (2009.01)
*H04W 40/02* (2009.01)
*H04M 3/42* (2006.01)

(52) U.S. Cl.
CPC ......... *H04W 4/12* (2013.01); *H04M 3/42059* (2013.01); *H04W 40/02* (2013.01)

(58) Field of Classification Search
CPC ......... H04W 4/12; H04W 40/02; H04W 4/16; H04M 3/42059; H04M 3/4365
USPC ....... 455/412.1–414.2, 415–419, 567, 552.1, 455/420, 422.1, 456.1, 466, 448, 455, 455/518; 379/201.01, 142.01, 164, 93.01, 379/22.08, 142.05, 7.47, 80, 88.02
See application file for complete search history.

(56) References Cited

U.S. PATENT DOCUMENTS 6,041,103 A * 3/2000 La Porta ............... H04M 1/663
379/201.01
6,173,048 B1 * 1/2001 Malik ............... H04M 3/42153
340/7.47
(Continued)

FOREIGN PATENT DOCUMENTS

EP         2393269 A1   12/2011
WO      02078309 A1   10/2002
(Continued)

OTHER PUBLICATIONS

"Enabling caller to attach a text message along with his voice call to convey the intent of the call to the callee", An IP.com Prior Art Database Technical Disclosure, Authors et. al.: Disclosed Anonymously, IP.com No. 000220080, IP.com Electronic Publication: Jul. 20, 2012, 4 pages.
(Continued)

*Primary Examiner* — Babar Sarwar
(74) *Attorney, Agent, or Firm* — David B. Woycechowsky (57) ABSTRACT

Techniques for implementing telephone call purpose codes, which are codes included in the data of an attempted telephone call, which purpose code provide information relating to the telephone call's purpose. Also, techniques for handling telephone calls in a machine logic rule based manner in ways that depend, at least in part, upon the purpose code of the attempted telephone call.

14 Claims, 3 Drawing Sheets

(56) References Cited

U.S. PATENT DOCUMENTS

| | | | | |
|---|---|---|---|---|
| 6,400,808 | B1* | 6/2002 | Burg | H04M 3/4938 379/88.02 |
| 7,283,813 | B2 | 10/2007 | Hamanaga et al. | |
| 7,388,951 | B2* | 6/2008 | Moss | H04M 3/42042 379/142.05 |
| 7,477,730 | B2* | 1/2009 | Starbuck | H04M 1/2478 379/142.01 |
| 7,561,676 | B2 | 7/2009 | Fernandes et al. | |
| 7,561,870 | B2* | 7/2009 | Holt | H04M 3/42204 379/221.08 |
| 7,817,790 | B2* | 10/2010 | Sanmugasuntharam | H04M 3/02 370/352 |
| 7,907,716 | B2 | 3/2011 | Stuckman et al. | |
| 8,332,481 | B2* | 12/2012 | Sheth | H04M 3/42042 379/93.01 |
| 8,553,852 | B2* | 10/2013 | Leeds | H04M 1/57 379/164 |
| 9,226,049 | B2* | 12/2015 | Grandhi | H04M 3/42042 |
| 2006/0025112 | A1* | 2/2006 | Hamanaga | H04M 1/56 455/412.1 |
| 2006/0036697 | A1 | 2/2006 | Lin et al. | |
| 2006/0072713 | A1* | 4/2006 | Fernandes | H04M 3/42382 379/80 |
| 2010/0158227 | A1 | 6/2010 | Grandhi et al. | |
| 2012/0011357 | A1 | 1/2012 | Finlay | |
| 2012/0221651 | A1 | 8/2012 | Rabii | |
| 2013/0070914 | A1 | 3/2013 | Raghav et al. | |
| 2014/0171044 | A1 | 6/2014 | Liang et al. | |
| 2014/0179288 | A1* | 6/2014 | Ashtikar | H04M 3/4365 455/415 |

FOREIGN PATENT DOCUMENTS

| | | |
|---|---|---|
| WO | 2008100673 A1 | 8/2008 |
| WO | 2009089255 A1 | 7/2009 |

OTHER PUBLICATIONS

"Phone Fraud Stops Here", Pindrop Security, provided by inventor in Disclosure as of Sep. 15, 2014, © 2010-2013 Pindrop Security, <http://www.pindropsecurity.com/>, 4 pages.

"Would you like to know who called you?", Tellows—The community for phone numbers and phone spam, provided by inventor in disclosure as of Aug. 7, 2014, <http://www.tellows.com/>, 8 pages.

* cited by examiner

ENHANCED MOBILE CALLING WITH CALL PURPOSE

BACKGROUND OF THE INVENTION

The present invention relates to the field of caller information associated with a telephone call, and more particularly to the use of a core/network control plane in communicating information associated with a telephone call.

In a telephone communications network (also sometimes herein referred to as a "telephone system"), a control plane is the core network between two calling parties. The control plane is typically owned and managed by one or more service providers. The base transceiver station (BTS), base station subsystem (BSC), mobile switching center (MSC), home location register (HLR), visitor location register (VLR), etc. are components of a control plane in a typical global system for mobile communications (GSM) network.

U.S. Pat. No. 6,400,808 discloses as follows: "A system . . . for providing call subject information to a called party. A call subject platform receives a call from a calling party. The call subject platform prompts the calling party to provide call subject information. If call subject information is received at the call subject platform from the calling party, then the call subject platform sends at least part of the call subject information to the called party."

SUMMARY

According to an aspect of the present invention, there is a method, computer program product and/or system that performs the following operations (not necessarily in the following order): (i) receiving, by a control plane of a message network and from a message device, a message data set corresponding to an attempted message, with the message data set including a first identifier code and a first purpose code identifying the first message purpose; and (ii) selectively routing the attempted message through the message network based, at least in part, on the first purpose code.

According to a further aspect of the present invention, there is a method, computer program product and/or system that performs the following operations (not necessarily in the following order): (i) receiving, by a control plane of a telephone network and from a first telephone device, an attempted telephone call data set corresponding to an attempted telephone call, with the attempted telephone call data set including a called party identifier code and a first purpose code identifying the first message purpose; and (ii) selectively routing the attempted telephone call through the telephone network based, at least in part, on the first purpose code.

DETAILED DESCRIPTION

Some embodiments of the present invention perform one or more of the following operations: (i) receive, by a control plane of a telephone network and from a caller telephone device, an attempted telephone call data set corresponding to an attempted telephone call, with the attempted telephone call data set including a called party identifier code; (ii) determine a first call purpose code(s), and with the first call purpose code(s) relating to a caller party's purpose in making the attempted telephone call from the caller telephone device; (iii) validate, in a control plane of a telephone network, the first call purpose code(s) with the pre-registered information and/or providing additional set of purpose codes; (iv) selectively route the attempted telephone call through the telephone network based, at least in part, on the first call purpose code; (v) called party moving the logical validation to the control plane; and/or (vi) control plane taking smart decisions based on the situation.

This Detailed Description section is divided into the following sub-sections: (i) The Hardware and Software Environment (largely discussing FIG. 1); (ii) Example Embodiment (largely discussing FIGS. 2 and 3); (iii) Further Comments and/or Embodiments (in part discussing FIG. 4); and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
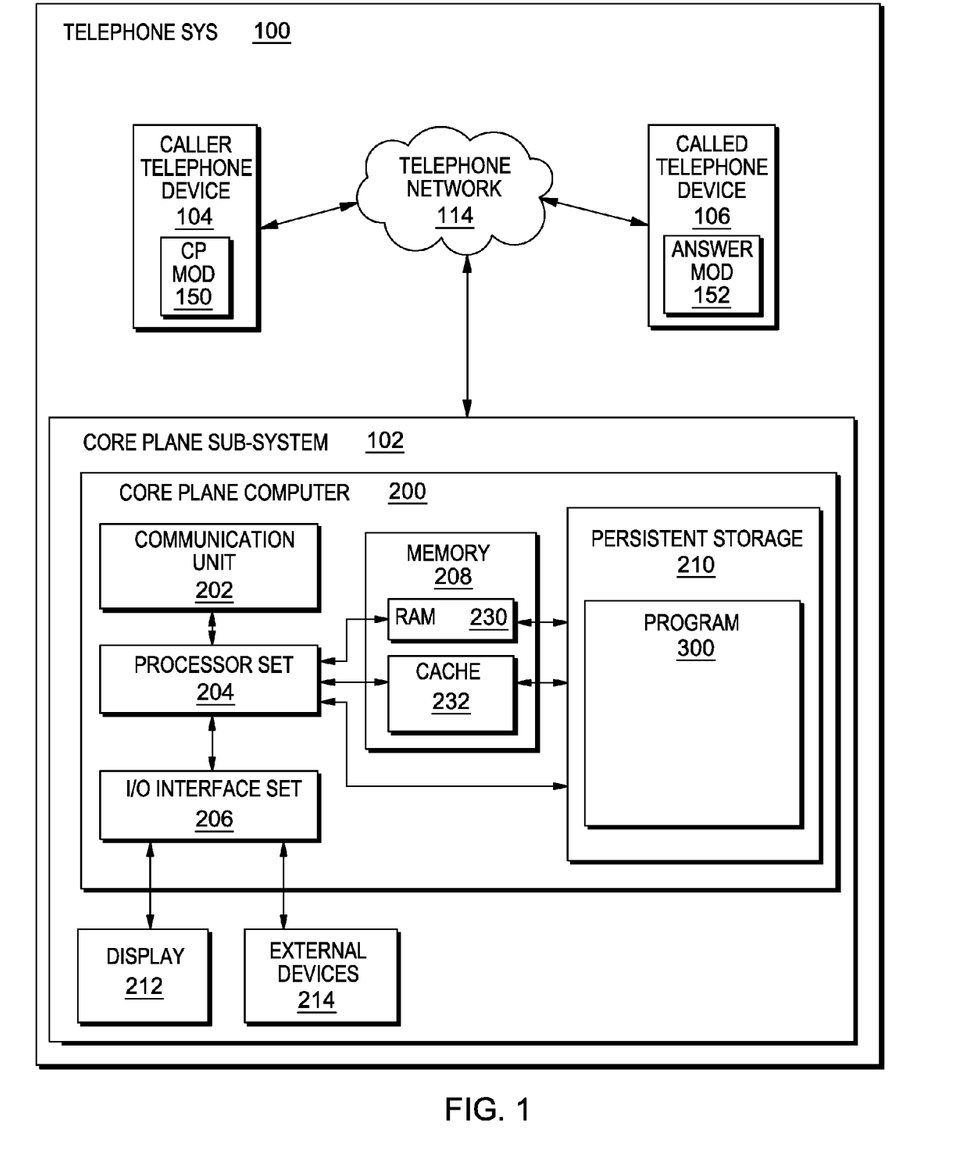
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of telephone system 100, including: core plane sub-system 102; caller telephone device 104 (including call preference module 150); called telephone device 106 (including answering module 152); telephone network 114; core plane computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
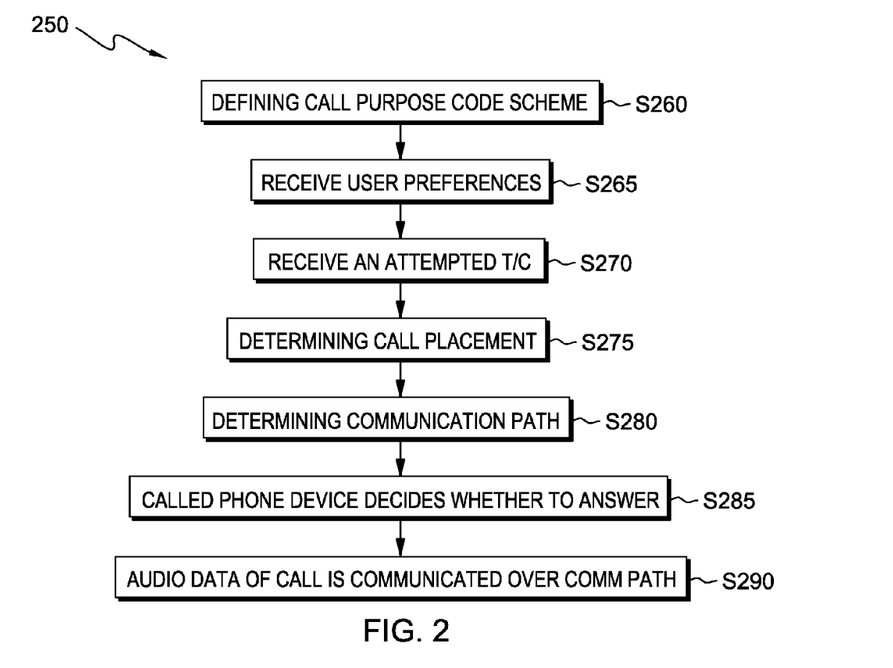
FIG. 2 is a flowchart showing a first embodiment method performed, at least in part, by the first embodiment system.
Figure 3:
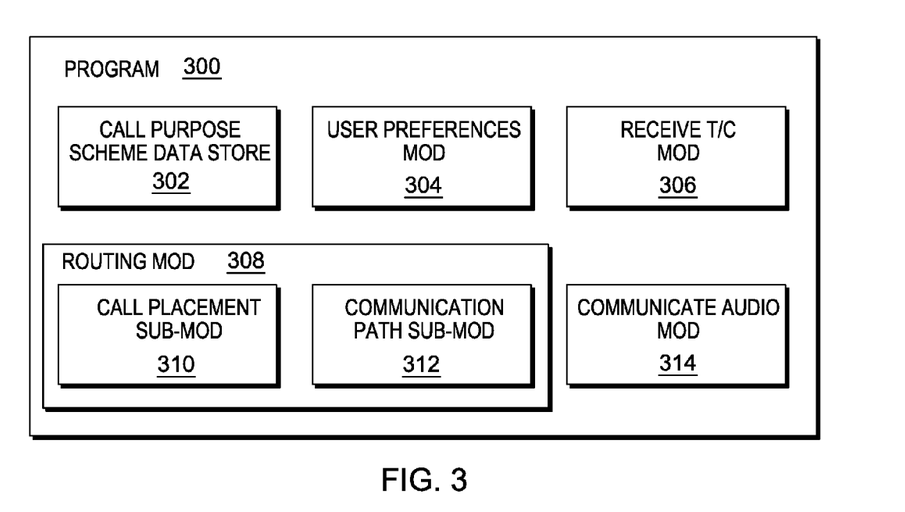
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at operation S260, where system designers define a call purpose coding scheme to be used in handling telephone calls communicated over telephone network 114 (see FIG. 1). This call purpose code scheme is stored in call purpose scheme data store 302. In this example, the call purpose code scheme is hierarchical, including codes and sub-codes (if any) under each top level code, as follows:

| | |
|---|---|
| 0 | Personal Call |
| | 0 Chat |
| | 1 News to relate |
| | 2 Need information |
| 1 | Medical Call |
| | 0 Emergency |
| | 1 Non-Emergency |
| 2 | Government Call |
| | 0 Election related |
| | 1 Revenue related |
| | 2 Law enforcement |
| 3 | Business Call (non-Solicitation) |
| | 0 Wholesale Consumer Goods/Services |
| | 1 Retail Consumer Goods Services |
| | 2 Business-to-business |
| | 3 Professional services |
| 4 | Solicitation Call |
| | * no sub-codes* |

Processing proceeds to operation S265, where a user (not shown) uses answer module 152 of telephone call purpose preference information to user preferences module ("mod") 304 through telephone network 114 (see FIG. 1). In this example, the user preference information includes: (i) what hours the user will accept calls for each code/sub-code combination; (ii) how many "rings" the user will allow for each code/sub-code combination; (iii) re-direct telephone numbers and/or voice over internet protocol type internet addresses (if any) for each code/sub-code combination; (iv) whether the call will be allowed to interrupt a pre-existing, on-going telephone call in which called telephone device 106 may be engaged; and/or (v) whether the user is willing to pay a premium for preferential telephone network routing of calls respectively having each code/sub-code combination. As will be discussed in detail, below in the next sub-section of this Detailed Description section, many other types of user preferences are possible. In this embodiment, this user preference information is stored locally at call purpose mod 152, and also stored at various locations in the core plane of the telephone network (for example, in core plane computer 200 (see FIG. 1)).

After the call purpose related user preference information is collected and stored for called telephone device 106, calls to this telephone respectively having various associated call purpose code/sub-code data will be handled based, in part, on: (i) the call purpose code; and (ii) the user's selected preference(s) corresponding to the call purpose code.

Processing proceeds to operation S270, where receive telephone call mod 306 of core plane sub-system 102 receives data associated with an attempted telephone call through telephone network 114 (see FIG. 1). More specifically, in this example, caller telephone call device 104 is attempting to make a telephone call to called telephone device 106. In attempting to make the call, call purpose ("CP") mod 150 of the caller telephone device has controlled and managed the user's entry of a call purpose code/sub-code combination associated with the attempted call. In this example, the code/sub-code combination is "11," which signifies a non-emergency medical call. This code is chosen because, in this example, the call is attempted to be placed by an automatic calling machine in a dentist's office and relates to confirmation of a routine dentistry appointment for a human user associated with called telephone device 106.

Processing proceeds to operation S275, where routing mod 308 determines the identity of the device(s) (if any) to which the attempted telephone call will be routed. More specifically, call placement sub-mod 310 of mod 308 determines, based at least in part on the call purpose related user preference information for called telephone 106, whether a call with purpose "11" will be routed to: (i) called telephone 106; (ii) some other device(s), specified in the call purpose related user preference information for called telephone 106; or (iii) whether the call will be refused (that is, routed to no devices). In this example, the user of called telephone has specified that calls with purpose code(s) "11" will be: (i) received by called telephone device between the hours of 8 am and 8 pm; and (ii) sent to answering service between the hours of 8 pm and 8 am. In this example, the time is noon, meaning that call placement sub-mod will direct the core plane to continue to attempt to place the call to called telephone device 106, which corresponds to the telephone number called by caller telephone device 104.

Processing proceeds to operation S280, where communication path sub-mod 312 of mod 308 determines what the physical communication path (wired and/or wireless) for the audio data of the call will be. In this example telephone network 114 includes three sub-networks (not separately shown in the Figures): (i) normal priority call sub-network; (ii) high priority call sub-network; and (iii) medical call sub-network. Although these sub-networks may share some data communication path hardware, they are controlled and managed to be at least somewhat independent of each other so that: (i) the high priority call sub-network has the highest rated quality of service; (ii) the medical call sub-network has an intermediate level rated quality of service; and (iii) the normal priority call sub-network has the lowest rated quality of service (albeit a quality of service rating that is generally acceptable). In this example, the user of called telephone device has not chosen for calls having preference code "11" to be routed through the high priority network (thus avoiding a premium charge). For this reason, communication path sub-mod 312 does not route the telephone call through the high priority call sub-network. However, because the call is a medical-related call, communication path sub-mod will route the call through the medical call sub-network. This example shows how call preference information can interact with either, or both, of the following: (i) called party user preferences related call purpose; and/or (ii) telephone network provider policies related to call purpose.

Processing proceeds to operation S285, where: (i) the attempted call is placed to called telephone device 106 through the medical call sub-network of telephone network 114 (see FIG. 1); and (ii) the user of called telephone device 106 decides whether to: (i) answer the call; (ii) refuse the call; or (iii) let the call go into voicemail. In this example, the call purpose (in this example, "MEDICAL, NON-EMERGENCY") is displayed by answer mod 152 on a display (not shown in the Figures) built into called device 106. Further in this example, answer mod has been programmed so that calls having a purpose code of "11" will be sent to voicemail after one ring. However, in this example, the user of called device 106 answers the call during the first ring so that the attempted telephone call is now fully connected and ready for mutual communication of audio data.

Processing proceeds to step S290, where communicate audio mod 314 controls communication audio data of the call communicated through the medical call sub-network of telephone network 114 between caller device 104 and called device 106. In this example, the user of called device 106 decides to re-schedule the dental appointment, using voice commands, through automated menus built into the automatic caller machine that is using caller telephone device 104.

III. FURTHER COMMENTS AND/OR EMBODIMENTS

Some embodiments of the present invention may include one, or more, of the following features, characteristics and/or advantages: (i) limits the growing number of anonymous calls; (ii) enables a call recipient to know the purpose of a call from an unknown caller, without the recipient having to answer the call; (iii) bases the call management solution at the receiver end on the identity of the caller and on the purpose of the call; (iv) bases the call management solution at the receiver end on caller provided dynamic information specific to a call; (v) provides flexibility to a caller to provide information about a call; and/or (vi) provides flexibility to a call recipient to manage calls based on caller provided information specific to the call and on information provided by the control plane.

In some embodiments of the present invention, when a caller makes a call to a recipient, a short text message and a numeric identifier (also referred to as identifier) are initiated by the caller and sent with the call to be displayed on the receiver's phone. Both the message and the identifier are sent, with other call set-up information, to the control plane. In addition to sending the identifier, a registered trademark name, if applicable, can also be sent along by the control plane.

The short text message explains the purpose of the call (for example "urgent-daddy", "new bank card", "mobile account verification", etc.). The text message is typed or selected from a pre-defined set of messages. Alternatively, the caller can speak and the audio is converted to text. The length of the short text message is defined for particular types of communication according to the length of the call setup message (for example, 20 characters for global system for mobile communications (GSM)).

In some embodiments of the present invention, the identifier is defined by the telecom regulators in the control plane/switching device (home location register (HLR)). The caller sends the identifier based on the purpose of the call. Regulators can also mandate identifiers for certain groups such banks.

Figure 4:
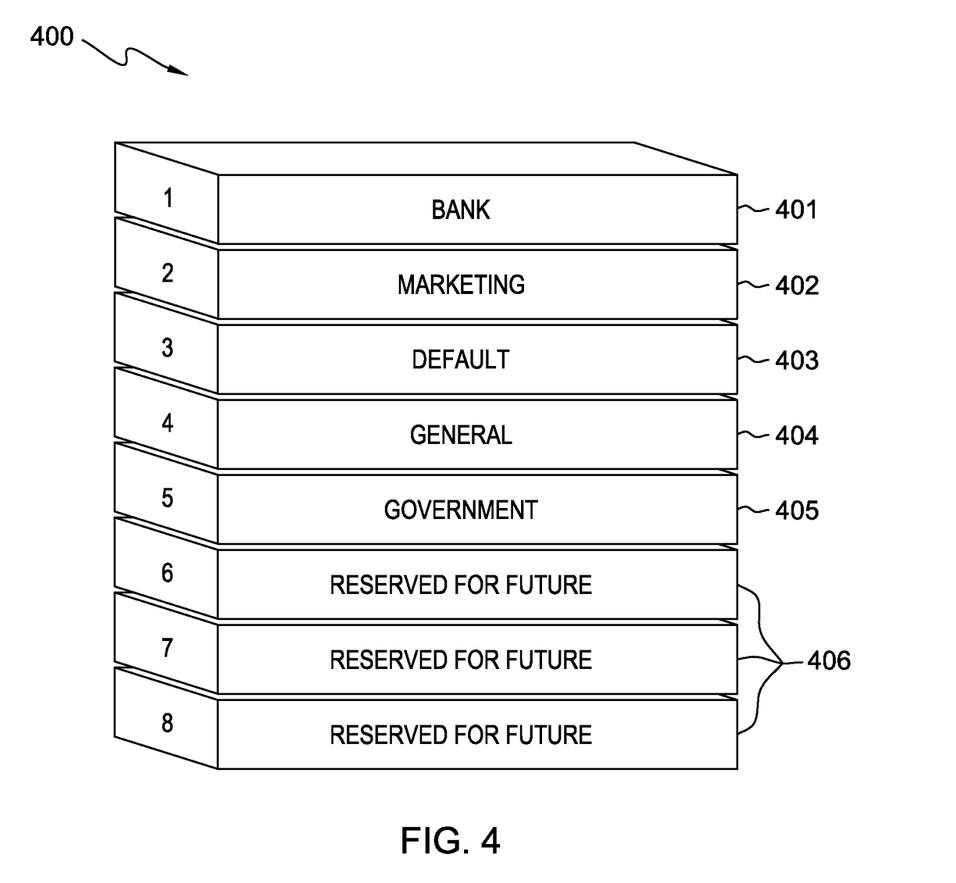
FIG. 4 is a table showing information that is helpful in understanding embodiments of the present invention.

As shown in FIG. 4, table 400 includes: bank block 401; marketing block 402; default block 403; general block 404; government block 405; and reserved blocks 406.

In some embodiments of the present invention, in some regions, a call from a bank has the identifier set as "1" (bank, see FIG. 4). Mobile users set rules based at least in part on the identifier. The rules are stored either in the control plane or in the mobile device. For example, a rule could be defined that blocks all calls from credit card providers having the identifier set as "2" (marketing). Another rule could implement a "do not disturb" setting in which all calls are blocked except calls having the identifier set as "5" (government).

In some embodiments of the present invention, mobile users can set rules based on the identifier. The rules can either be stored in the control plane or in the mobile device. Example rules include "block all the calls from credit card marketers". Such a rule acts similarly to setting "do not disturb" or in silent mode accept only government calls.

In some embodiments of the present invention, the control plane can set rules based on the identifier. For example, "override all rules set by the call recipient, allowing government calls during emergency situations (when network traffic is high), and disable marketing calls.

In some embodiments of the present invention, when the phone rings, the phone can display both the identifier description and the short text message along with the calling number. For example, "[phone number] calling, [institution category], [institution name]—address verification". Further, a mobile user can set rules based on the short text message, (similar to setting rules in email applications) such as "block a call if the message contains 'credit card'."

In some embodiments of the present invention, a message and the identifier are stored in a call log. When a user does not answer a call, they can later retrieve the context from the call log and decide whether or not to call back.

Some embodiments of the present invention may include one, or more, of the following features, characteristics and/or advantages: (i) an identifier and the text message are sent to help the recipient to know the purpose of the call; (ii) call rejection rules can be defined at receiver device level; (iii) call rejection rules can be defined at the switch/control plane level; (iv) during call waiting situations, the recipient is able to make an informed decision to answer or ignore the incoming call without putting an existing caller on hold; (v) along with profile selection in mobile (silent, general, etc.), user can also set device level privacy settings, for example, during vacation, only personal calls will be received; (vi) users can return missed calls based on their priority, by looking at the identifier and text in call history log; (vii) provides more governance and control to service providers on every call made; (viii) carries out pre-specified operations, reducing bandwidth usage and unanswered calls; and/or (ix) improves service quality to customers by allowing them to judge source organization and nature of a call and then respond appropriately.

In some embodiments of the present invention, the control plane is owned, managed and/or is constituted by components as described, above, in the Background section.

In some embodiments of the present invention, when a new official or commercial subscriber is assigned, the following actions take place: (i) one or more mandatory parameters are set by the service provider in accordance with the buyer's request; (ii) the relevant phone(s) are tagged with a numeric identifier; and/or (iii) a registered trademark name can be registered with the control plane which can send along the trademark with calls from the assigned phone(s). Alternatively, for personal use, a new subscriber's phone may be tagged with an identifier such as "4" (general).

In some embodiments of the present invention, whenever a phone is obtained for official/commercial purposes, for example, government phones will be tagged with "5" (government). Any number of sub-identifiers, as defined by regulators and service providers can be applied. For example, the identifier for "government" can have sub-identifiers such as "income tax", or "corporation". Phones used only for specific purposes can be tagged to a generic identifier and a specific sub-identifier when put into service. For example, identifier "bank" and sub-identifier "marketing" can be applied if the phone is to be used only for marketing purposes. The identifiers are sent along with the called number for interpretation by the control plane.

In some embodiments of the present invention, phones used for multiple purposes can be tagged to a generic name when put into service. The specific use can be entered while making a call by selection of the desired sub-identifier. For example, if a bank uses the same phone for service calls, and promotions, a caller can enter a number to indicate the sub-identifier, for example to indicate the call is a promotional call. The general identifier "1" (bank) is sent automatically by phone along with the sub-identifier to indicate that the call is a promotional call from a bank.

Consider a case where a user receives a call showing as coming from a particular banking institution, and identified as a "service call". After answering the call, if the user finds out that the call is for promotions rather than a service call, the user can file a complaint against the offending institution, as the caller can modify only the sub-identifier but can modify neither the general identifier ("1" (bank)) nor the trademark.

This is not only used for authentication but also for moving the logical validation from the recipient's end to the control plane. For example, in some embodiments of the present invention, a customer can set their profile to indicate that they do not want to receive calls from specific tagged elements between 2 PM and 4 PM. Instead of his mobile phone rejecting such calls, the control plane itself will reject the call, thereby reducing the call volume as well as bandwidth usage across some elements in the path. In some regions, the subscriber could get a list of calls from the service provider, including details of any calls that were rejected at the control plane.

In some embodiments of the present invention, the control plane can make smart decisions based on the situation. For example, during an emergency situation, when the call volume is very high, the control plane itself can set the priority based on callers' identifiers and can block certain calls. As another example, when two calls are made to the same number, instead of rejecting both calls, the control plane can block one call and allow another, based on the priority set by the user. The foregoing scenarios are possible, especially in cases where software defined networks are implemented by CSPs.

Some embodiments of the present invention may include one, or more, of the following features, characteristics and/or advantages: (i) provides the purpose of the call to the receiver with the help of the core network/control plane; (ii) enhances the control plane's functionality in mobile/landline networks to set one or more levels of identifiers for every call made, to indicate the purpose of a call; and/or (iii) moves the customer's (recipient) logical validation set in profile/preference from the phone to the control plane so that the control plane can make smart decisions before completing calls, and avoid last mile hops, thereby increasing operational efficiency.

Some embodiments of the present invention may include one, or more, of the following features, characteristics and/or advantages: (i) the control plane authenticates the messages; (ii) in some cases, a control plane controls the call based at least in part on the situation; (iii) the sending phone sends an identifier as determined by the control plane; (iv) the identifier is input by the caller whereupon the control plane validates the identifier, or alternatively, the control plane itself generates the identifier based as least in part on the caller's phone number; (v) the service provider tags phone numbers with an identifier; and/or (vi) the service provider tags phone numbers with an enterprise name so that the control plane can send the enterprise name when a call originates from a tagged phone number.

Further with reference to (v) in the above paragraph, the tag can originate from the caller and the control plane can validate it, or the control plane itself generates the tag based on the caller's number. For example, all phones assigned to an enterprise are tagged with an identifier specific to that enterprise. When a call is made from a phone assigned to the enterprise, the identifier is also sent. The control plane provided by the service provider handles the identifier.

Some embodiments of the present invention may include one, or more, of the following features, characteristics and/or advantages: (i) a caller cannot give a false message about the call (for example, a mobile number assigned identifier "1" (bank) cannot use identifier "5" (government)) while sending a message; (ii) if two incoming calls arrive simultaneously at the switch (control plane), the control plane determines which call to put through first, based at least in part on the priority/message; (iii) control plane blocks promotional calls during peak hours (for example during government holidays, control plane can block calls with identifier "2" (marketing); (iv) a user can set "preferred" or "do not disturb me" times; (v) the control plane will allow only important calls to be routed, and suppress non-important calls, during "do not disturb me" times; and/or (vi) for suppressed calls, a message is sent to the recipient phone such as "a call from number x with message xyz was suppressed".

Further with regard to item (iii) in the above paragraph, an advantage to having a call blocked by the control plane rather than by the receiving phone, is that network bandwidth usage is less and the "last-mile hop" is avoided.

Some embodiments of the present invention may include one, or more, of the following features, characteristics and/or advantages: (i) associates a message with an incoming call; (ii) defines the purpose of a call; (iii) provides, to a call recipient, details about the call with the help of pre-set information in the core network/control plane; (iv) enhances control plane's management functionality in telephone networks; (v) sets one or more levels of identifiers for each phone number; (vi) indicates for every call made, the purpose of the call; (vii) allows moving the customer's (receiver) logical validation set from profile/preference in the phone to the control plane's management functionality; (viii) the control plane makes smart decisions before completing calls thereby avoiding last mile hops and increasing operational efficiency; (ix) provides more governance and control to core network/control plane on every call made, to carry out pre-specified operations; (x) uses multiple levels of identifiers set in the core network/control plane to identify the caller's categorization and purpose of the call (for example, banking—sales department); (xi) provides the caller with details based on the control plane's identifiers; and/or (xii) provides ability to the core network/control plane to use the set of identifiers to identify the categorization under which the calling phone number is aligned and used to indicate the purpose of the call to the receiver.

Some embodiments of the present invention enhance a control plane's management functionality in mobile/landline networks to set one or multiple levels of identifiers for each phone number and thereby for every call made. The purpose of the call is provided to the receiver with the help of pre-set information in the core network/control plane, and does not rely upon a text message entered manually by the call sender.

In some embodiments of the present invention, a system allows moving the customer's (receiver) logical validation set from profile/preference in the handset/landline to the control plane's management so that control plane can use machine logic to make decisions before the call is communicated all the way to the intended call recipient. This can avoid "last mile hops," which increases operational efficiency. For example, consider a customer who sets their profile in such a way that they do not want to receive calls from phones with a core plane identifier code of "Bank—Marketing" between 2 PM and 4 PM. Instead of sending the call and allowing call receiver mobile to reject such calls, the control plane itself will do the job, using machine logic in the control plane itself, thereby saving both the un-received/rejected calls volume as well as bandwidth across network elements in the path. In some embodiments, the customer is later notified with the list of calls that were "held" (that is, rejected) by the control plane.

It is understood that conventional caller id is conventionally stored in the core control plane (conventionally in a portion of the core control plane called "switches/HLR"). Conventional caller identification (caller id) provides identifiers associated with the call, such as the name of the person registered with the calling telephone. However, this conventional caller id corresponds to a caller and not a caller's purpose. This identification of the caller provides generally insufficient information, associated with the call, to allow intelligent decisions to be made: (i) regarding whether to route the telephone call (for example, decisions made by the machine logic in the control plane; and/or (ii) regarding whether to accept the call (for example, by a human user deciding whether to manually accept or reject the call). Also, once conventional caller id information is registered with the service provider, this information cannot be changed by the caller on a call by call basis while making a series of sequential telephone calls.

Some embodiments include the service provider tagging the phone numbers with one or multiple levels of identifiers which will be validated along with the address. The caller can also send sub-level identifiers while making the call (explained with examples below). So, in one of the embodiments, apart from just sending the message, the sender phone can now send the identifier as well determined by the control plane (say, for example, 1: Bank, 2: Government, 3: Personal). The control plane will be able to authenticate and validate the call. In some embodiments, the tag can either originate from the caller and the control plane can validate or, the control plane itself can generate the tag based on the caller's number. For example, all phones given to income tax department can be tagged to identifier "9." Whenever any call is made by those phones, the identifier is also sent by the caller or control plane. The control plane provided by the service provider will handle the identifier.

Some embodiments include multiple levels of sub-identifiers as identified by regulators and service providers. For example, the top level call-purpose category "Government" may include second level sub-categories like "income tax" and "corporation." The second level sub-category of "corporation" may include third level sub-sub-categories, such as "new corporations," "existing corporations" and "expired corporations."

In some embodiments, phones used only for specific purposes can be tagged to a generic identifier and a sub-category when bought. eg) Identifier 'Bank' and sub identifier 'Marketing' if the phone has to be used only for marketing purpose which can be sent along with the called number as prefix or suffix for interpretation by the control plane. It can be changed later by giving a request to the service provider.

In some embodiments, phones used for multiple purposes can be tagged to a generic name when bought and the specific use can be mentioned while making the call by selecting the desired sub-identifier. For example, if banks use the same phone for service call and promotions, then a caller at the bank can dial a number to indicate the sub-identifier corresponding to the specific call's sub-category (for example, sub-category "1" for promotional calls); and then phone number. This would indicate that the purpose of the call is banking related (due to its top level category registered for the bank's telephone on the bank's premises), and further indicating it is a promotional call due to the entry of sub-identifier "1" (corresponding to sub-category "promotions") by the caller. In this example, general identifier "bank" will be sent automatically by phone. Other embodiments may use different rules for deciding whether a given category level is entered: (i) by the caller on a call by call basis; (ii) set by the telephone for all outgoing calls; (iii) set by default, with the possibility of override by the user; and/or (iv) other rule schema now known or to be developed in the future. In this way, a phone number registered as "bank" can be used for "promotions" purpose a for few days, and for "service call" on a few other days by changing the identifiers sent by the caller and/or sent automatically by the phone.

In some embodiments, any misuse of call purpose identifiers by a user (such as, incorrect purpose identifier entry by a caller, incorrect identifier code registration by a phone installer) can be dealt legally and/or contractually based on user's complaints (for example, complaints to telecommunications service providers, complaints to government entities).

The enterprise name can also be tagged to the phone number so that the control plane can send the name of the enterprise whenever there is any call from that number. Phones obtained for personal use can be tagged as "general."

Some embodiments provide flexibility to the caller to provide information about the call (via messages, identifiers) and enables the control plane to validate and/or add on further information so that the receiver can manage the calls based on both the caller provided information specific to the call made and the information provided by the control plane. Some embodiments provide improved service quality to end customers by allowing them to judge source organization and nature of call from unknown caller numbers and then respond.

Some embodiments of the present invention may include one, or more, of the following characteristics, features and/or advantages: (i) in case of two simultaneous incoming calls for say person A, the control plane can decide based on the priority of the identifiers; (ii) control plane can block any promotional calls during peak hours (for example, during Government holidays, control plane can block all calls with identifier "5"-marketing); (iii) each user can set their preferred or 'Do Not Disturb Me' timings, so the control plane will only allow important calls to be routed during that time; and/or (iv) an intimation message (eg, a text message) that a call from number x with message xyz was suppressed.

In some embodiments, call purpose identification is not only used for authentication, but also for moving the logical validation from user's end to control plane. For example, a customer can set his profile in such a way that he does not want to receive calls from "bank" and/or other tagged purpose categories between 2 PM and 4 PM. Instead of his mobile rejecting such calls, going forward, the control plane itself will do the job thereby not allowing the call to go through the user end, saving both the un-received/rejected call volume, as well as bandwidth across some elements in the path. The subscriber could register for a value added service (VAS) with the service provider to get details of calls that were held back at the control plane. In some embodiments, the control plane can make smart decisions based on the situation. For example, during emergency time, when the call volume is very high, the control plane itself can set the priority based on the identifier and can also block certain calls. Another example is when two calls are made to the same number, instead of rejecting both the calls, control plane can block one call and send another based on the priority set by the user. This becomes possible when software defined networks (SDNs) spread out into the CSPs.

Embodiments of the present invention are not intended to apply exclusively to telephone communications. Some embodiments may apply to types of messaging and/or communications other than conventional telephone communications, and/or may involve one or more messaging networks and/or messaging devices.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber/called party/caller party: includes, but is not necessarily limited to, the following: (i) a single individual human; (ii) an artificial intelligence entity with sufficient intelligence to act as a user or subscriber; and/or (iii) a group of related users or subscribers.

Telephone call: an actual, or attempted, communication of audio data through a telephone network.

Telephone network: any communication network that includes a core plane which includes a control plane and a data plane; includes, but is not necessarily limited to, conventional telephone networks as they currently exist.

Called party identifier: includes, but is not necessarily limited to, conventional style telephone numbers.

What is claimed is:

1. A method comprising:
   receiving, by a control plane of a telephone network and from a first telephone device, an attempted telephone call data set corresponding to an attempted telephone call, with the attempted telephone call data set including a called party identifier code and a first purpose code identifying the first message purpose; and
   selectively routing the attempted telephone call through the telephone network based, at least in part, on the first purpose code;
   wherein:
   the selective routing includes:
      selecting, based at least in part upon the user input, at least one call placement alternative from among a plurality of call placement alternatives, with the plurality of call placement alternatives including at least one of the following call placement alternatives:
   (i) communicating the attempted telephone call through to a second telephone device associated with the called party identifier code, and
   (ii) suppressing the attempted telephone call;
   the attempted telephone call data set further includes a second purpose code with the second purpose code relating to a caller party's purpose in making the attempted telephone call from the first telephone device; the first purpose code corresponds to a top level purpose category; and the second purpose code corresponds to a second level purpose sub-category of the top level purpose category such that the first and second call purpose codes are hierarchically related.

2. The method of claim 1 further comprising:
   registering the first telephone device with the control plane so that the first purpose code can be determined by the control plane based on an identity of the first telephone device; and
   determining, by the control plane, the first purpose code based on the identity of the first telephone device so that the identity of the first telephone device serves as the first purpose code information.

3. The method of claim 1 wherein:
   the first purpose code is included in the attempted telephone call data set received from the first telephone device so that the first message purpose is the first purpose code.

4. The method of claim 1 wherein the step of selectively routing includes:
   determining a communication path through the control plane of the telephone network, from the first telephone device to a second telephone device for audio data associated with the attempted telephone call;
   wherein the second telephone device is a telephone device associated with the called party identifier code.

5. The method of claim 1 further comprising:
   receiving, by the control plane and from a user of the second telephone device, user input;
   wherein the selection of the call placement alternative is based, at least in part upon the user input.

6. A computer program product comprising a computer readable storage medium which is non-transitory and has stored thereon: first program instructions, executed by a processor or a device, programmed to receive, by a control plane of a telephone network and from a first telephone device, an attempted telephone call data set corresponding to an attempted telephone call, with the attempted telephone call data set including a called party identifier code and a first purpose code identifying the first message purpose; and second program instructions, executed by a processor or a device, programmed to selectively route the attempted telephone call through the telephone network based, at least in part, on the first purpose code; wherein: the second program instructions include: program instructions programmed to select, based at least in part upon the user input, at least one call placement alternative from among a plurality of call placement alternatives, with the plurality of call placement alternatives including at least one of the following call placement alternatives: (i) communicating the attempted telephone call through to a second telephone device associated with the called party identifier code, and (ii) suppressing the attempted telephone call;
   the attempted telephone call data set further includes a second purpose code, with the second purpose code relating to a caller party's purpose in making the attempted telephone call from the first telephone device; the first purpose code corresponds to a top level purpose category; and the second purpose code corresponds to a second level purpose sub-category of the top level purpose category such that the first and second call purpose codes are hierarchically related.

7. The computer program product of claim 6 further comprising:
   third program instructions, executed by a processor or a device, programmed to register the first telephone device with the control plane so that the first purpose code can be determined by the control plane based on an identity of the first telephone device; and
   fourth program instructions, executed by a processor or a device, programmed to determine, by the control plane, the first purpose code based on the identity of the first telephone device so that the identity of the first telephone device serves as the first purpose code information.

8. The computer program product of claim 6 wherein:
   the first purpose code is included in the attempted telephone call data set received from the first telephone device so that the first message purpose is the first purpose code.

9. The computer program product of claim 6 wherein second program instructions programmed to selectively route the attempted telephone call through the telephone network based, at least in part, on the first purpose code includes:
   third program instructions, executed by a processor or a device, programmed to determine a communication path through the control plane of the telephone network, from the first telephone device to a second telephone device for audio data associated with the attempted telephone call;
   wherein the second telephone device is a telephone device associated with the called party identifier code.

10. The computer program product of claim 6 further comprising:
fourth program instructions programmed to receive, by the control plane and from a user of the second telephone device, user input;
wherein the selection of the call placement alternative is based, at least in part upon the user input.

11. A computer system comprising: a processor(s) set; and a non-transitory computer readable storage medium; wherein the processor(s) set is structured, located, connected and/or programmed to run program instructions stored on the non-transitory computer readable storage medium; the program instructions are executable by the processor(s) set; the program instructions include: first program instructions programmed to receive, by a control plane of a telephone network and from a first telephone device, an attempted telephone call data set corresponding to an attempted telephone call, with the attempted telephone call data set including a called party identifier code and a first purpose code identifying the first message purpose; and second program instructions programmed to selectively route the attempted telephone call through the telephone network based, at least in part, on the first purpose code; wherein the second program instructions include: program instructions programmed to select at least one call placement alternative from among a plurality of call placement alternatives, with the plurality of call placement alternatives including at least one of the following call placement alternatives: (i) communicating the attempted telephone call through to a second telephone device associated with the called party identifier code, and (ii) suppressing the attempted telephone call; the attempted telephone call data set further includes a second purpose code, with the second purpose code relating to a caller party's purpose in making the attempted telephone call from the first telephone device; the first purpose code corresponds to a top level purpose category; and the second purpose code corresponds to a second level purpose subcategory of the top level purpose category such that the first and second call purpose codes are hierarchically related.

12. The computer system of claim 11 further comprising:
third program instructions programmed to register the first telephone device with the control plane so that the first purpose code can be determined by the control plane based on an identity of the first telephone device; and
fourth program instructions, executable by the processor(s) set, programmed to determine, by the control plane, the first purpose code based on the identity of the first telephone device so that the identity of the first telephone device serves as the first purpose code information.

13. The computer system of claim 11 wherein:
the first purpose code is included in the attempted telephone call data set received from the first telephone device so that the first message purpose is the first purpose code.

14. The computer system of claim 11 wherein second program instructions programmed to selectively route the attempted telephone call through the telephone network based, at least in part, on the first purpose code includes:
third program instructions, executable by the processor(s) set, programmed to determine a communication path through the control plane of the telephone network, from the first telephone device to a second telephone device for audio data associated with the attempted telephone call;
wherein the second telephone device is a telephone device associated with the called party identifier code.

* * * * *